United States Patent
Kuo

(10) Patent No.: US 8,105,486 B1
(45) Date of Patent: Jan. 31, 2012

(54) WATER-CLEANER

(75) Inventor: Chi-Chang Kuo, Taichung (TW)

(73) Assignee: New Century Membrane Technology Co., Ltd., Taichung (TW)

( * ) Notice: Subject to any disclaimer, the term of this patent is extended or adjusted under 35 U.S.C. 154(b) by 0 days.

(21) Appl. No.: 12/938,099

(22) Filed: Nov. 2, 2010

(51) Int. Cl.
*C02F 9/02* (2006.01)
*B01D 27/08* (2006.01)
*B01D 27/14* (2006.01)
*B01D 29/54* (2006.01)
*B01D 63/00* (2006.01)
*B01D 63/08* (2006.01)

(52) U.S. Cl. ........ 210/232; 210/234; 210/235; 210/238; 210/244; 210/266; 210/282; 210/321.84; 210/347; 210/257.1; 210/257.2

(58) Field of Classification Search .................. 210/232, 210/238, 257.2, 234, 235, 244, 266, 282, 210/321.84, 347, 257.1
See application file for complete search history.

(56) References Cited

U.S. PATENT DOCUMENTS

| 4,477,347 | A | * | 10/1984 | Sylva | 210/232 |
| 4,684,471 | A | * | 8/1987 | Manojlovic | 210/665 |
| 4,894,154 | A | * | 1/1990 | Roz et al. | 210/266 |
| 7,575,678 | B2 | * | 8/2009 | Kuo | 210/232 |

* cited by examiner

*Primary Examiner* — Thomas M Lithgow

(57) ABSTRACT

A water-cleaner includes a bowl, a tank, a tube, a filtering unit, at least one sleeve, a cover, an exhaust unit and a valve. The tank includes an aperture defined in a lower portion. The tank is located on the bowl. The tube includes apertures transversely defined therein. The tube is inserted in the tank. The filtering unit includes filtering bags stacked on one another and located around the tube. Each of the filtering unit includes an exit in communication with related ones of the apertures of the tube. The sleeve is located around the tank and movable between first and second positions. In the first position, the sleeve and the tank together define a space for containing raw water. The cover is located on the sleeve. The exhaust unit is arranged between the sleeve and the cover. The valve is located in the aperture of the tank.

8 Claims, 8 Drawing Sheets

WATER-CLEANER

BACKGROUND OF INVENTION

1. Field of Invention

The present invention relates to an efficient, portable and electricity-free water-cleaner.

2. Related Prior Art

As disclosed in U.S. Pat. No. 7,575,678, a conventional water-cleaner includes a base 10, a tank 20, a tube 30, a filtering unit 40 and at least one movable sleeve 50. The filtering unit 40 includes filtering bags 41 stacked on one another and located around the tube 30 in a water-tight manner. Each of the filtering bags 41 includes an exit 413 in communication with the tube 30. The movable sleeve 50 is located around the tank 20 and movable up and down along an axis of the tank 20.

A thread 54 formed on an internal side of the movable sleeve 50 is engaged with a thread 23 formed on an external side of the tank 20 when the movable sleeve 50 is located in an upper position relative to the tank 20. Thus, the sleeves 50 and 20 together define a space for containing raw water. The level of the raw water is higher than the elevation of the filtering unit 40. The raw water travels through the filtering unit 40 because of gravity. The raw water gets filtered and cleaned by the filtering bags 41 when it travels through the filtering bags 41. Filtered and cleaned water travels through a channel defined in the tube 30 and a channel 12 defined in the base 10. The filtered and cleaned water is released from the water-cleaner by operating the tap.

A thread 53 formed on an internal side of the movable sleeve 50 is engaged with the thread 23 formed on the external side of the tank 20 when the movable sleeve 50 is located in a lower position relative to the tank 20. Thus, the size of the conventional water-cleaner is reduced for easy storage and transportation.

The conventional water-cleaner is operable without having to consume any electricity. The conventional water-cleaner can easily be stored and transported. However, there are problems encountered in the use of the conventional water-cleaner. At first, the raw water is filled in the conventional water-cleaner manually. The raw water must be retained above proper level to provide adequate hydraulic pressure to reach a proper throughput of the filtered and cleaned water. In practice, the throughput of the filtered and cleaned water is low. Therefore, the conventional water cleaner is only useful for providing filtered and cleaned water to a few people.

Secondly, the filtered and cleaned water is released from the conventional water-cleaner by operating the tap or faucet. The conventional water-cleaner is not equipped with any container for containing the filtered and cleaned water. Not much filtered and cleaned water can be collected for later use unless an extra container is used.

Thirdly, the tank 20 is connected to the bowl 10 by engagement of threads with each other. The water-tightness is inadequate. There could be undesirable leak of water from the conventional water-cleaner.

The present invention is therefore intended to obviate or at least alleviate the problems encountered in prior art.

SUMMARY OF INVENTION

It is the primary objective of the present invention to provide an efficient, portable and electricity-free water-cleaner.

To achieve the foregoing objective, the water-cleaner includes a bowl, a tank, a tube, a filtering unit, at least one sleeve, a cover, an exhaust unit and a valve. The tank includes an aperture defined in a lower portion. The tank is located on the bowl. The tube includes apertures transversely defined therein. The tube is axially inserted in the tank. The filtering unit includes filtering bags stacked on one another and located around the tube. Each of the filtering unit includes an exit in communication with related ones of the apertures of the tube. The sleeve is located around the tank and movable between first and second positions. In the first position, the sleeve and the tank together define a space for containing raw water. The cover is located on the sleeve. The exhaust unit includes an end connected to the tube and an opposite end inserted in the vent. The valve is located in the aperture of the tank.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
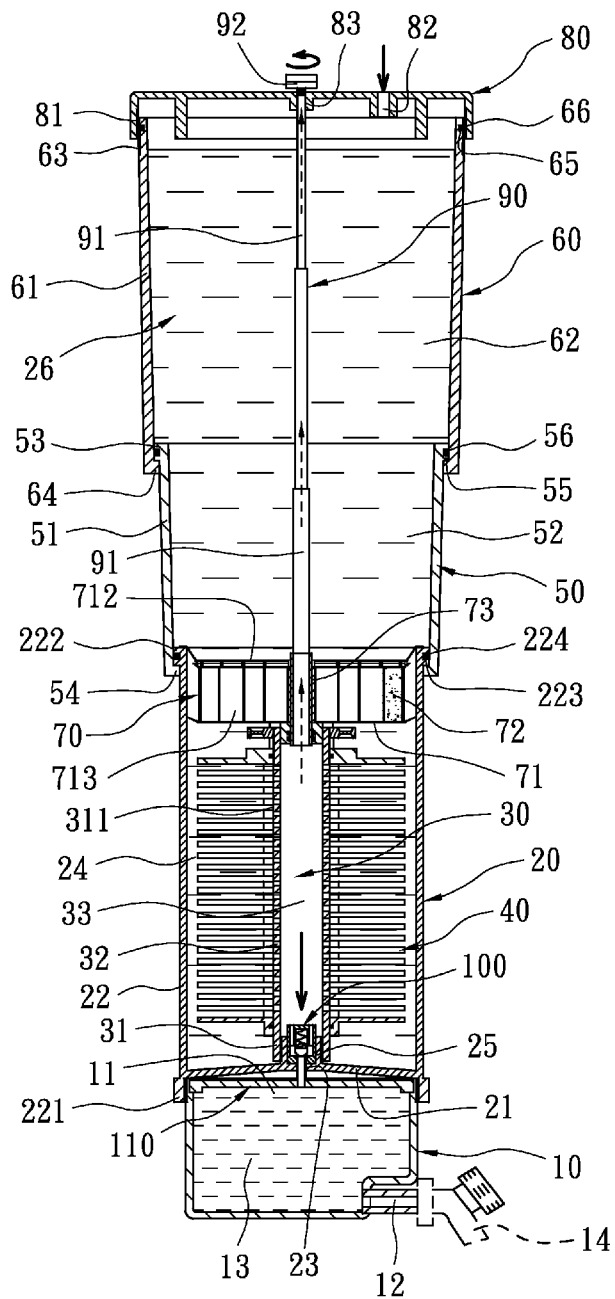
FIG. 1 is a cross-sectional view of a water-cleaner according to the preferred embodiment of the present invention.

Referring to FIG. 1, a water-cleaner includes a bowl 10, a tank 20, a tube 30, a filtering unit 40, two sleeves 50 and 60, a pre-filtering unit 70, a cover 80, an exhaust unit 90, a valve 100 and a disc 110 according to the preferred embodiment of the present invention.

The bowl 10 includes an opening 11, an outlet 12 and a space 13. The opening 11 is defined in the top of the bowl 10. The outlet 12 is defined in a tube horizontally extending from the bowl 10 near the bottom thereof. Both of the opening 11 and the outlet 12 are in communication with the space 13. To facilitate release of water from the bowl 10, a tap or faucet 14 is connected to the tube in which the outlet 12 is defined The tank 20 includes a wall 22 extending on and around a floor 21. The floor 21 includes an aperture 23 centrally defined therein. A well 25 extends on an upper side of the floor 21 and around the aperture 23. The wall 22 extends around an axis in perpendicular to the floor 21 to define a space 24. The tank 20 includes an annular lip 221 extending from a lower end thereof and an annular flange 222 extending around an upper end thereof. A sealing ring 224 is located in annular groove 223 defined in the annular flange 222. The tank 20 is firmly located on the bowl 10, with the annular lip 221 of the tank 20 located around the upper end of the bowl 10.

The tube 30 includes a wall 31 extending around an axis thereof, apertures 32 transversely defined in the wall 31, and a channel 33 longitudinally defined in the wall 31. The apertures 32 are in communication with the channel 33. The tube 30 is firmly located on the floor 21 of the tank 20, with a lower section of the tube 30 located around the well 25 of the tank 20. The channel 33 of the tube 30 is communication with the space 13 of the bowl 10 through the aperture 23 of the tank 20.

Figure 6:
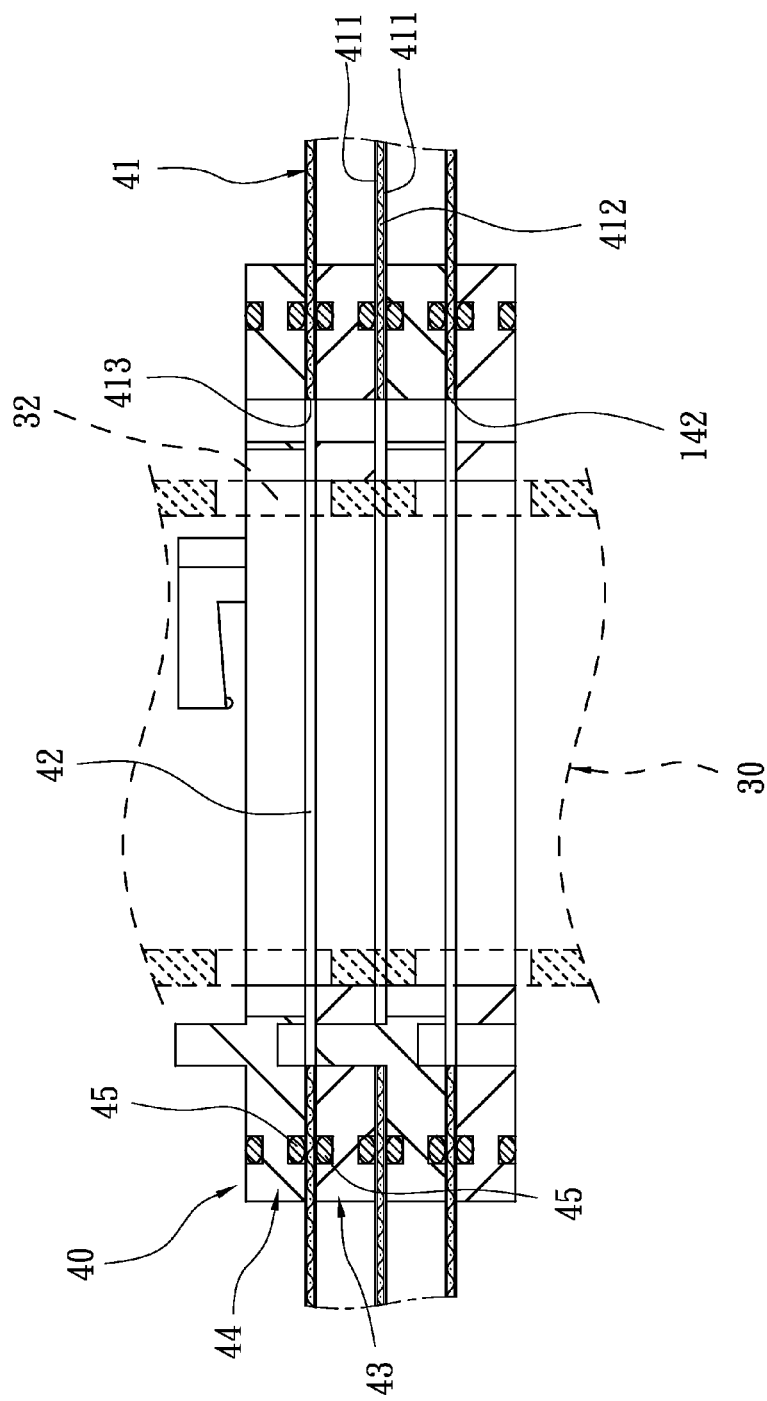
FIG. 6 is another enlarged cross-sectional view of the water-cleaner shown in FIG. 1.

Referring to FIG. 6, the filtering unit 40 includes filtering bags 41, positioning rings 43 and 44, and sealing rings 45. The filtering bags 41 are mounted around the tube 30 in a water-tight manner. The filtering bags 41 are flat. Each of the filtering bags 41 includes two membranes 411 for sandwiching a net 412. The membranes 411 are made of a polymer including pores of 0.01 micrometers in diameter. Each of the filtering bags 41 includes an intake 42 in communication with related ones of the apertures 32 and an exit 413 in communication with the intake 42. Each of the filtering bags 41 is located between a related one of the positioning rings 43 and a related one of the positioning rings 44. Each of the sealing rings 45 is located between a related one of the filtering bag 41 and a related one of the positioning rings 43 or 44.

Figure 2:
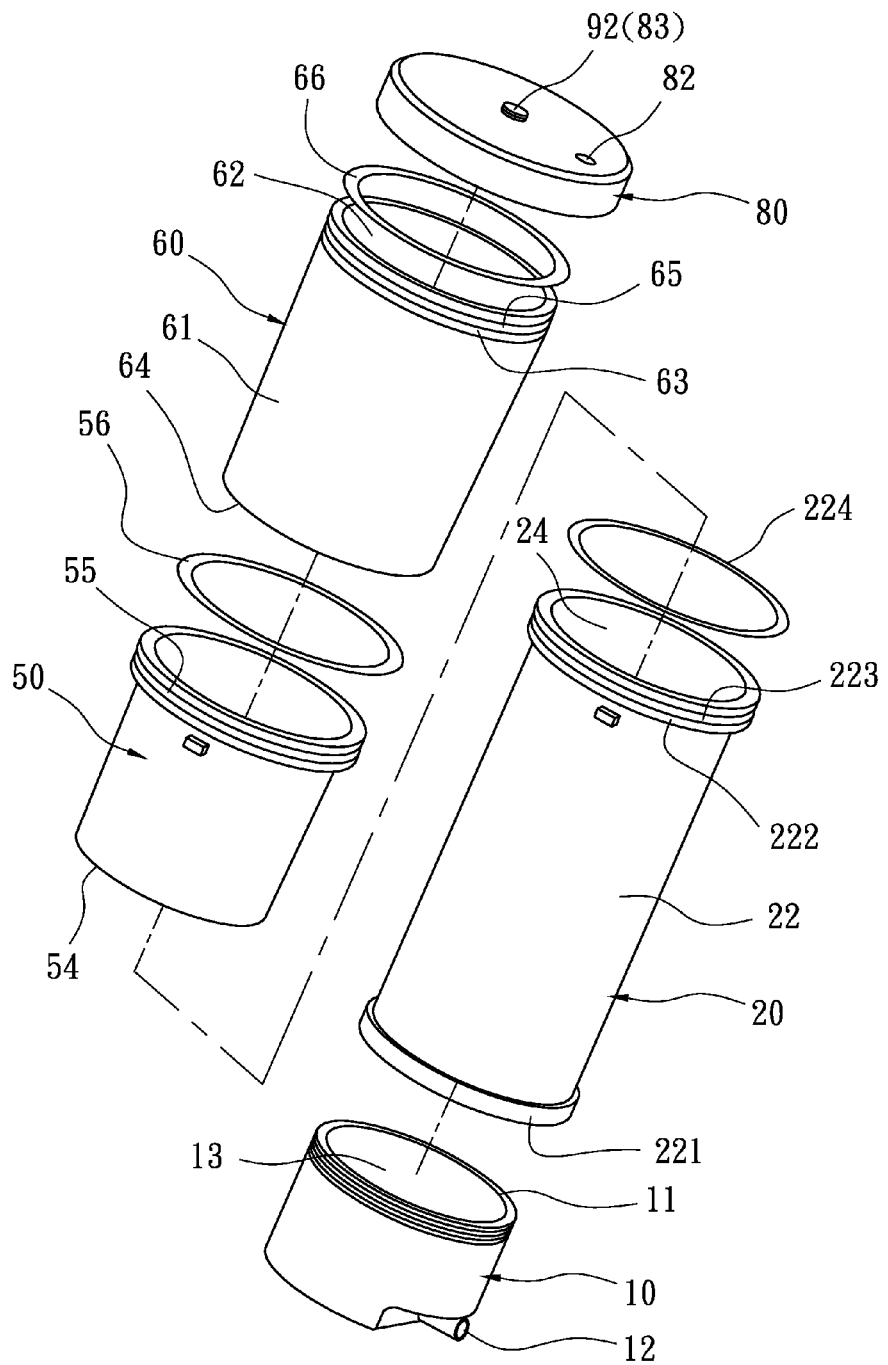
FIG. 2 is an exploded, partial view of the water-cleaner shown in FIG. 1.

Referring to FIGS. 1 and 2, the sleeve 50 includes a wall 51 extending around an axis thereof to define a channel 52, an external annular flange 53 extending on an external side of the wall 51, and an internal annular flange 54 extending on an internal side of the wall 51. A sealing ring 56 is fit in an annular groove 55 defined in the external annular flange 53. The wall 51 of the sleeve 50 is located around the wall 22 of the tank 20. The sleeve 50 is movable along the tank 20.

The sleeve 60 includes a wall 61 extending around an axis thereof to define a channel 62, a thread 63 extending on an external side of the wall 61, and an internal annular flange 64 extending on an internal side of the wall 51. A sealing ring 66 is fit in an annular groove 65 defined in the external side of the wall 61, near or in the thread 63. The wall 61 of the sleeve 60 is around the wall 51 of the sleeve 50. The sleeve 60 is movable along the sleeve 50.

Figure 7:
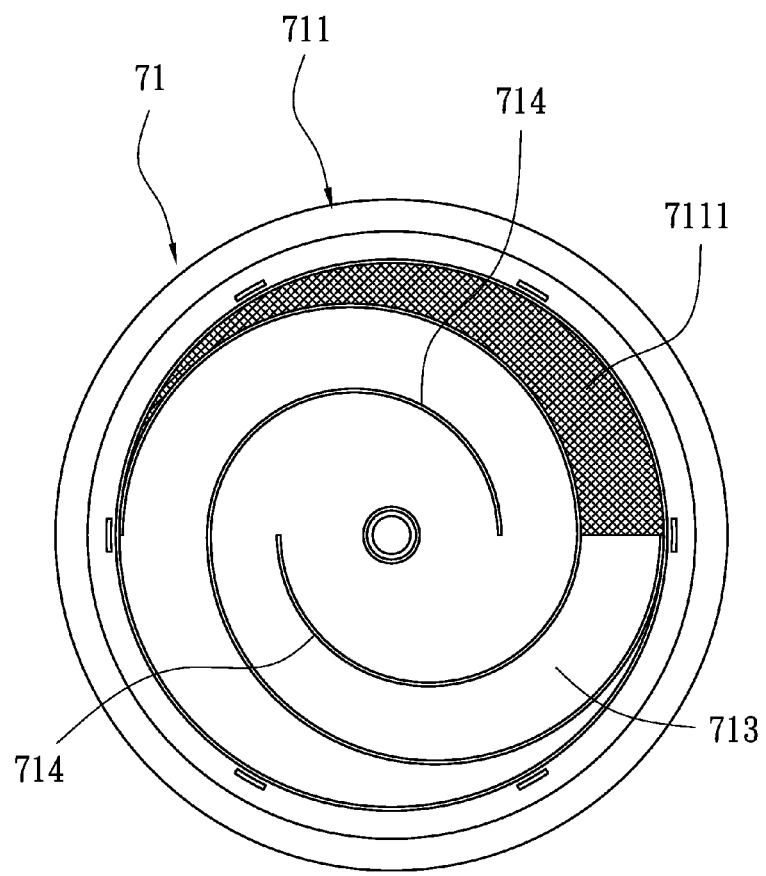
FIG. 7 is an enlarged top view of a filtering unit of the water-cleaner shown in FIG. 1.
Figure 8:
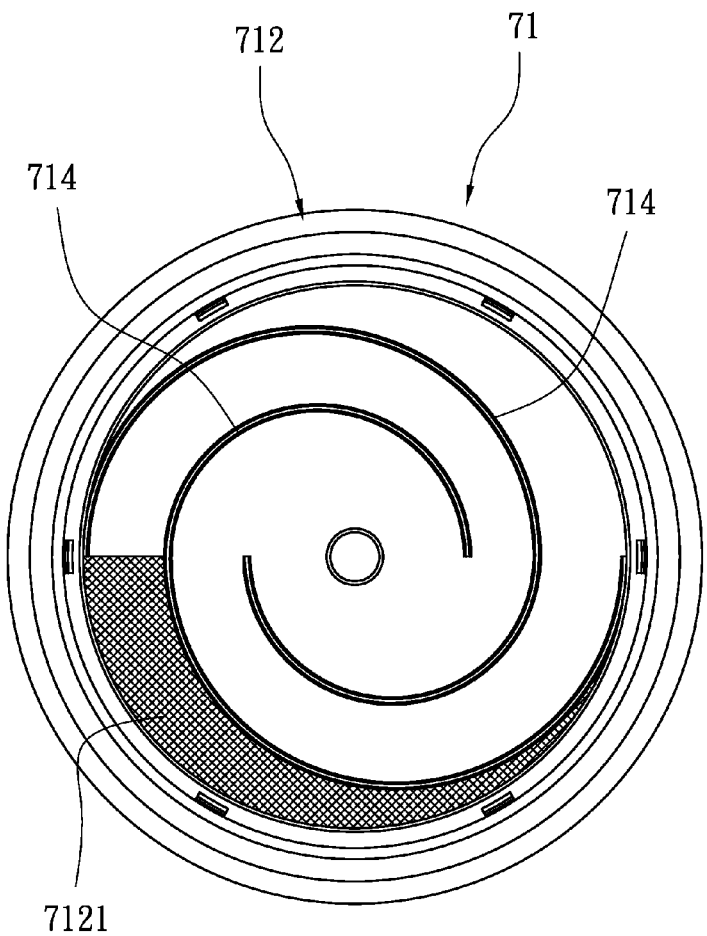
FIG. 8 is an enlarged bottom view of the water-cleaner shown in FIG. 1.

Referring to FIGS. 1, 7 and 8, the pre-filtering unit 70 includes a cassette 71, filtering material 72 and a tube 73. The cassette 71 includes a case 711, a cover 712 and partitions 714. The case 711 includes an inlet mesh 7111. The case 711 is detachably connected to an upper end of the tube 30. The cover 712 includes an outlet mesh 7121. The cover 712 is located on the case 711 after the partitions 714 are located in the case 711. The partitions 714 extend in a spiral manner. The filtering material 72 is filled in the case 711. With the partitions 714, spiral channels are defined in the case 711. The tube 73 is axially located in the case 711. The outlet mesh 7111 and the inlet mesh 7121 are located near opposite ends of the helical channels to maximize the length of the helical passages along which raw water travels and gets filtered.

The cover 80 includes a thread 81 extending on an internal side thereof, an inlet 82 defined therein, and a vent 83 defined therein. The cover 80 is firmly located on the sleeve 60, with the thread 81 engaged with the thread 63.

The exhaust unit 90 includes a telescopic configuration including tubes 91 and a valve 92 connected to an upper end of the uppermost tube 91. The upper end of the upper most tube 91 is inserted through the vent 83 of the cover 80. The lowermost tube 91 is inserted through the tube 73 in a water-tight manner by engagement of threads. A lower end of the lowermost tube 91 is inserted in the tube 30.

Figure 4:
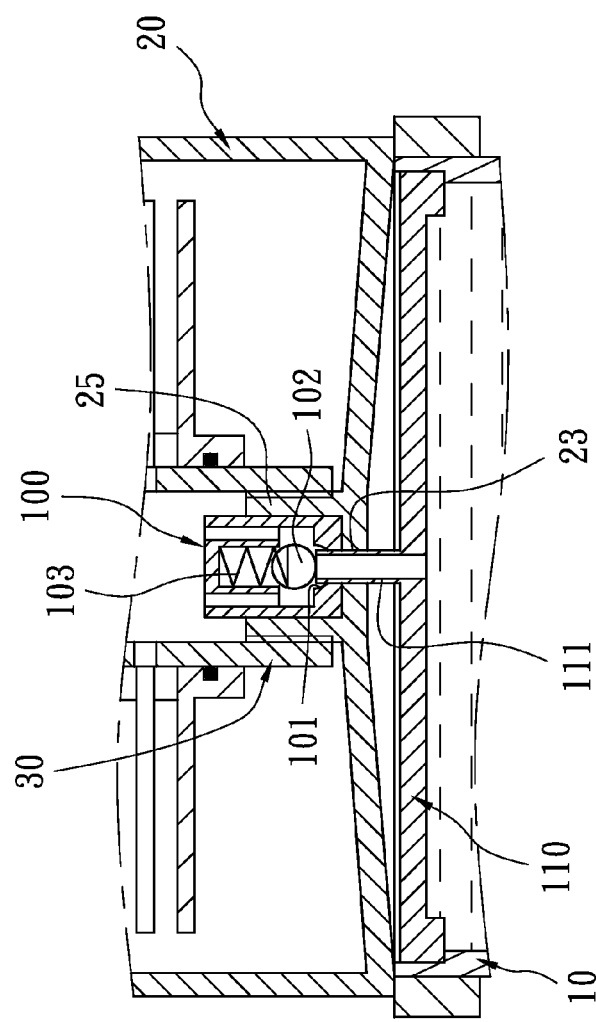
FIG. 4 is an enlarged cross-sectional view of the water-cleaner shown in FIG. 1.
Figure 5:
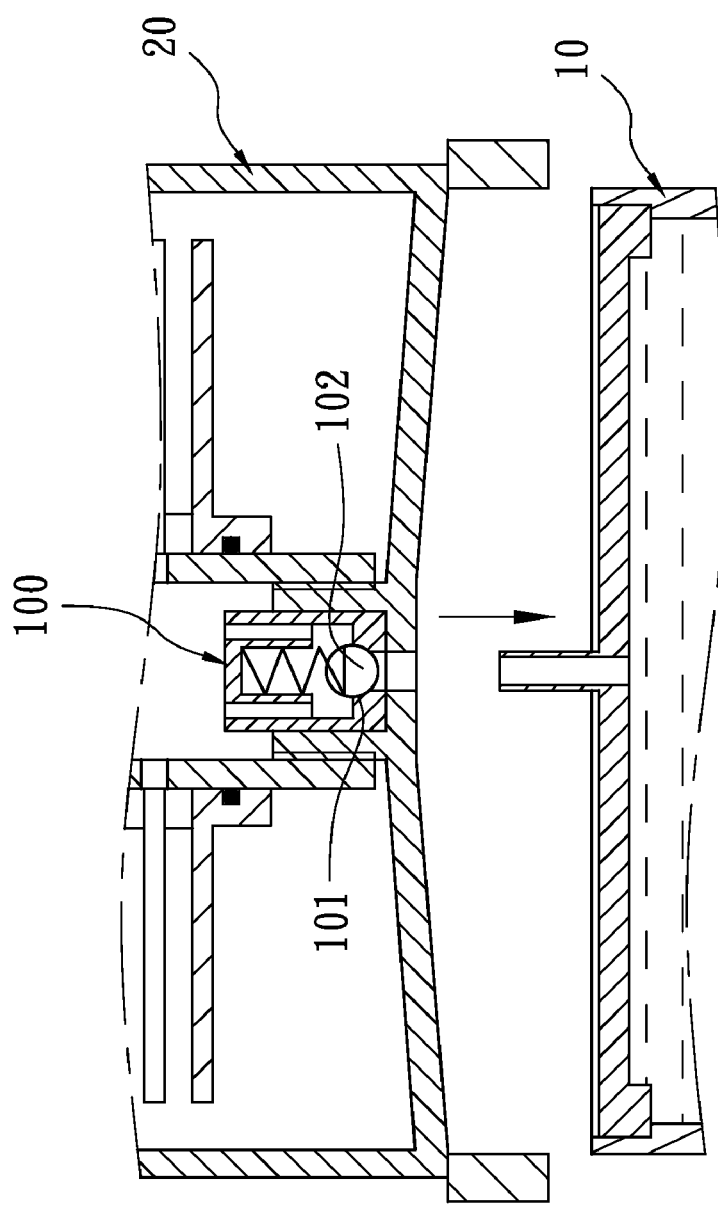
FIG. 5 is an enlarged cross-sectional view of the water-cleaner in another position than shown in FIG. 4.

Referring to FIGS. 1, 4 and 5, the valve 100 includes a housing 101, a ball 102 movably located in the housing 101, and a spring 103 compressed between a portion of the housing 101 and the ball 102. The housing 101 includes aperture that can be shut by the ball 102. A tube 111 is axially inserted through the disc 110.

In a first position shown in FIG. 1, the water-cleaner is completely extended for use. The internal annular flange 54 of the sleeve 50 is abutted against the external annular flange 222 of the tank 20. The internal annular flange 64 of the sleeve 60 is abutted against the external annular flange 53 of the sleeve 50. The space 24 of the tank 20, the space 52 of the sleeve 50, and the space 62 of the sleeve 60 are in communication with one another, and together define a space 26 for receiving the raw water via the inlet 82 of the cover 80 by pumping for example. The raw water is softened by the pre-filtering unit 70 before it is filtered and cleaned by the filtering unit 40. The exhaust unit 90 is extended.

Referring to FIG. 4, the tank 20 is located on the bowl 10. The tube 111 of the disc 110 is inserted in the housing 101 of the valve 100. The ball 102 is pushed away from the aperture of the housing 101 by the tube 111. Thus, the filtered and cleaned water is allowed to travel into the bowl 10 from the tank 20 through the valve 100. The filtered and cleaned water is stored in the bowl 10 for later use.

Referring to FIG. 5, the tank 20 is removed from the bowl 10 when the bowl 10 is going to be idle for a long time. The tube 111 of the disc 110 is pulled out of the housing 101 of the valve 100. The ball 102 is pushed to shut the aperture of the housing 101 by the spring 103. Thus, the filtered and cleaned water is not allowed to travel into the bowl 10 from the tank 20 through the valve 100.

Figure 3:
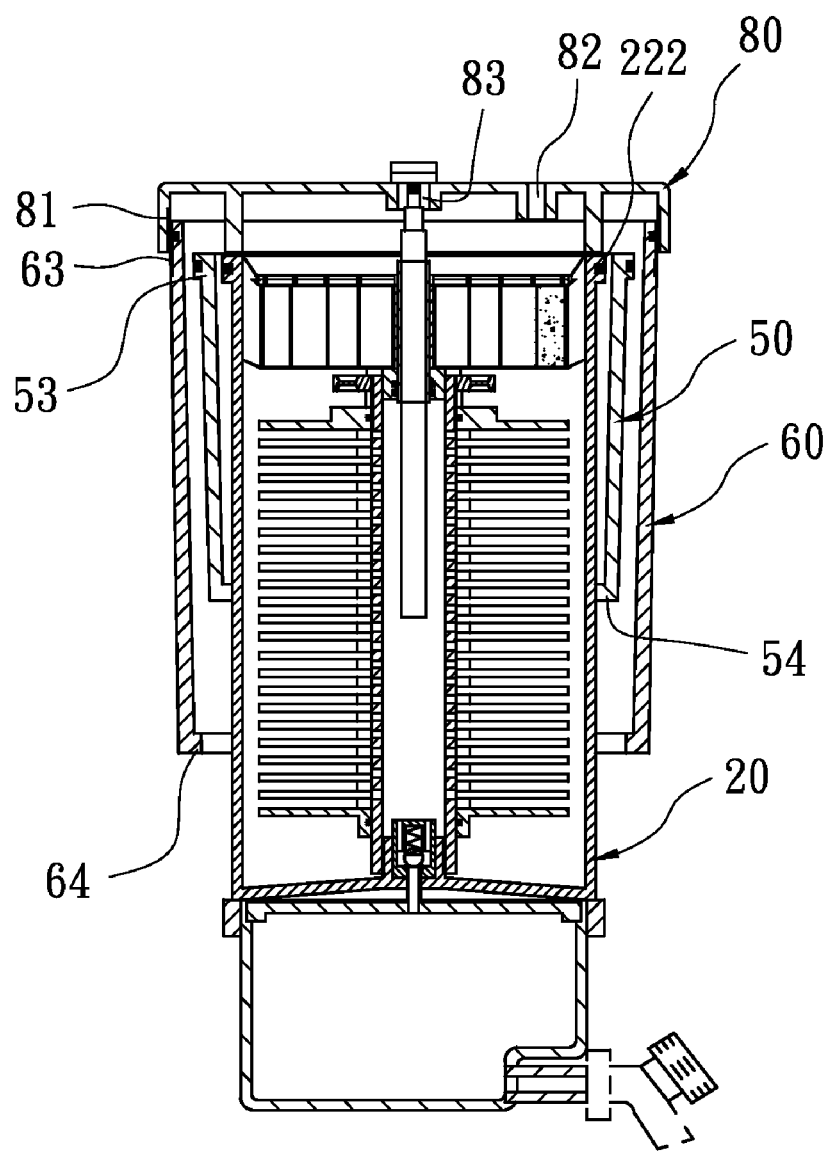
FIG. 3 is a cross-sectional view of the water-cleaner in a shrunk position than an extended position shown in FIG. 1.

In a second position shown in FIG. 3, the water-cleaner is completely shrunk for storage and transportation. The internal annular flange 54 of the sleeve 50 is separated from the external annular flange 222 of the tank 20. The internal annular flange 64 of the sleeve 60 is separated from the external annular flange 53 of the sleeve 50. The exhaust unit 90 is shrunk.

The water-cleaner is operable without having to consume any electricity. The water-cleaner can easily be storage and transported. Furthermore, the water-cleaner exhibits several advantages. At first, by pressing the cover 80, the volume of the water-cleaner is reduced. The hydraulic pressure in the raw water in the water-container is increased. The throughput of the filtering and cleaning of the raw water is increased.

Secondly, the filtered and cleaned water can be stored in the bowl 10 for later use.

Thirdly, the filtered and cleaned water is retained in the tank 20 by the valve 100 once the tube 111 of the disc 110 is pulled out of the housing 101 of the valve 100 as the tank 20 is removed from the bowl. No precious filtered and cleaned water is wasted.

The present invention has been described via the detailed illustration of the preferred embodiment. Those skilled in the art can derive variations from the preferred embodiment without departing from the scope of the present invention. Therefore, the preferred embodiment shall not position the scope of the present invention defined in the claims.

The invention claimed is:
1. A water-cleaner including:
a bowl including an outlet defined in a lower portion thereof;
a tank including a floor located on the bowl, a wall extending on the floor, and an aperture defined in the floor;
a primary tube including apertures transversely defined therein, wherein the primary tube is inserted in the tank;
a filtering unit including filtering bags stacked on one another and located around the primary tube, wherein each of the filtering units includes an exit in communication with a related one of the apertures of the primary tube;

at least one sleeve located around the tank and movable between first and second positions, wherein the sleeve and the tank together define a space for containing raw water;

a cover including a vent defined therein and an inlet through which the raw water is filled, wherein the cover is located on the sleeve;

a telescopic exhaust unit including a lower end connected to the primary tube and an upper end inserted through the vent so that the telescopic exhaust unit is shrunk as the cover is lowered and that the telescopic exhaust unit is extended as the cover is lifted;

an upper valve connected to the upper end of the telescopic exhaust unit;

a lower valve including a housing located in the tank, a ball movably located in the housing for opening and shutting the housing, and a spring for biasing the ball to shut the housing; and a disc located on the bowl and formed with a secondary tube for insertion in the housing to cause the ball to open the housing, thus communicating the tank with the bowl.

2. The water-cleaner according to claim 1, wherein the tank includes a well formed on the floor thereof, wherein the primary tube is inserted in the well of the tank, wherein the lower valve is located in the well of the tank.

3. The water-cleaner according to claim 1, wherein the wall of the tank includes an annular lip for receiving the bowl.

4. The water-cleaner according to claim 1, wherein the wall of the tank includes an external annular flange formed thereon for contact with the sleeve.

5. The water-cleaner according to claim 4, wherein the external annular flange of the wall of the tank includes an annular groove defined therein, wherein the tank includes a sealing ring fit in the annular groove.

6. The water-cleaner according to claim 4, wherein the sleeve includes an internal annular flange formed thereon for abutment with the external flange.

7. The water-cleaner according to claim 1, further including a pre-filtering unit located in the tank and above the filtering unit.

8. The water-cleaner according to claim 7, wherein the pre-filtering unit includes a cassette detachably connected to the primary tube and a filtering material located in the cassette.

* * * * *